United States Patent [19]

Makiguchi

[11] Patent Number: 5,029,114
[45] Date of Patent: Jul. 2, 1991

[54] METHOD OF DISPLAYING REDUCED-LAYOUT AND APPARATUS FOR EMBODYING THE METHOD

[75] Inventor: Atsushi Makiguchi, Tokyo, Japan

[73] Assignee: Kabushiki Kaisha Toshiba, Kawasaki, Japan

[21] Appl. No.: 319,887

[22] Filed: Mar. 7, 1989

Related U.S. Application Data

[63] Continuation of Ser. No. 75,062, Jul. 16, 1987, abandoned.

[30] Foreign Application Priority Data

Jul. 22, 1986 [JP] Japan .................................. 61-172264
Jul. 22, 1986 [JP] Japan .................................. 61-172267
Jul. 22, 1986 [JP] Japan .................................. 61-172268
Jul. 22, 1986 [JP] Japan .................................. 61-172269
Jul. 22, 1986 [JP] Japan .................................. 61-172270
Jul. 22, 1986 [JP] Japan .................................. 61-172271

[51] Int. Cl.$^5$ ............................................. G06K 15/02
[52] U.S. Cl. ..................................... 364/523; 364/518; 364/900
[58] Field of Search .................................. 364/518–523, 364/900 MS File; 340/721, 723, 724, 727, 729

[56] References Cited

U.S. PATENT DOCUMENTS

| 4,195,338 | 3/1980 | Freeman | 364/200 |
| 4,410,958 | 10/1983 | Demke et al. | 364/900 |
| 4,458,331 | 7/1984 | Amezcua et al. | 364/900 |
| 4,458,333 | 7/1984 | Smith | 364/900 |
| 4,463,442 | 7/1984 | Dachowski et al. | 364/900 |
| 4,506,343 | 3/1985 | Shipp, Jr. et al. | 364/900 |
| 4,608,662 | 8/1986 | Watanabe et al. | 364/900 |
| 4,608,664 | 8/1986 | Bartlett et al. | 364/900 |
| 4,713,754 | 12/1987 | Agarwal et al. | 364/200 |
| 4,745,560 | 5/1988 | Decker et al. | 364/518 X |
| 4,755,955 | 7/1988 | Kimura et al. | 364/518 |

FOREIGN PATENT DOCUMENTS 55-17418 of 0000 Japan.
54-89270 of 0000 Japan.
56-183890 of 0000 Japan.
58-214979 12/1983 Japan.

Primary Examiner—Heather R. Herndon
Attorney, Agent, or Firm—Finnegan, Henderson, Farabow, Garrett, and Dunner

[57] ABSTRACT

A reduced-layout display apparatus includes a clear section, a boundary pattern developing section, a print data developing section, a buffer section, and a display section. The clear section clears pattern data in a display buffer in response to setting of a print image display mode. The boundary pattern developing section develops boundary pattern data corresponding to a boundary pattern indicating a paper size capable of printing in the buffer section at a predetermined reduction ratio. A print image pattern corresponding print data is reduced at the reduction ratio by the print data developing section, and the reduced print image pattern data is also developed in the buffer section. The reduced-layout display apparatus can comprise a clipping range detecting section for detecting a range of print data to be developed. Even when a screen of the display section has a limited size, the print image can be displayed using a plurality of frames.

20 Claims, 18 Drawing Sheets

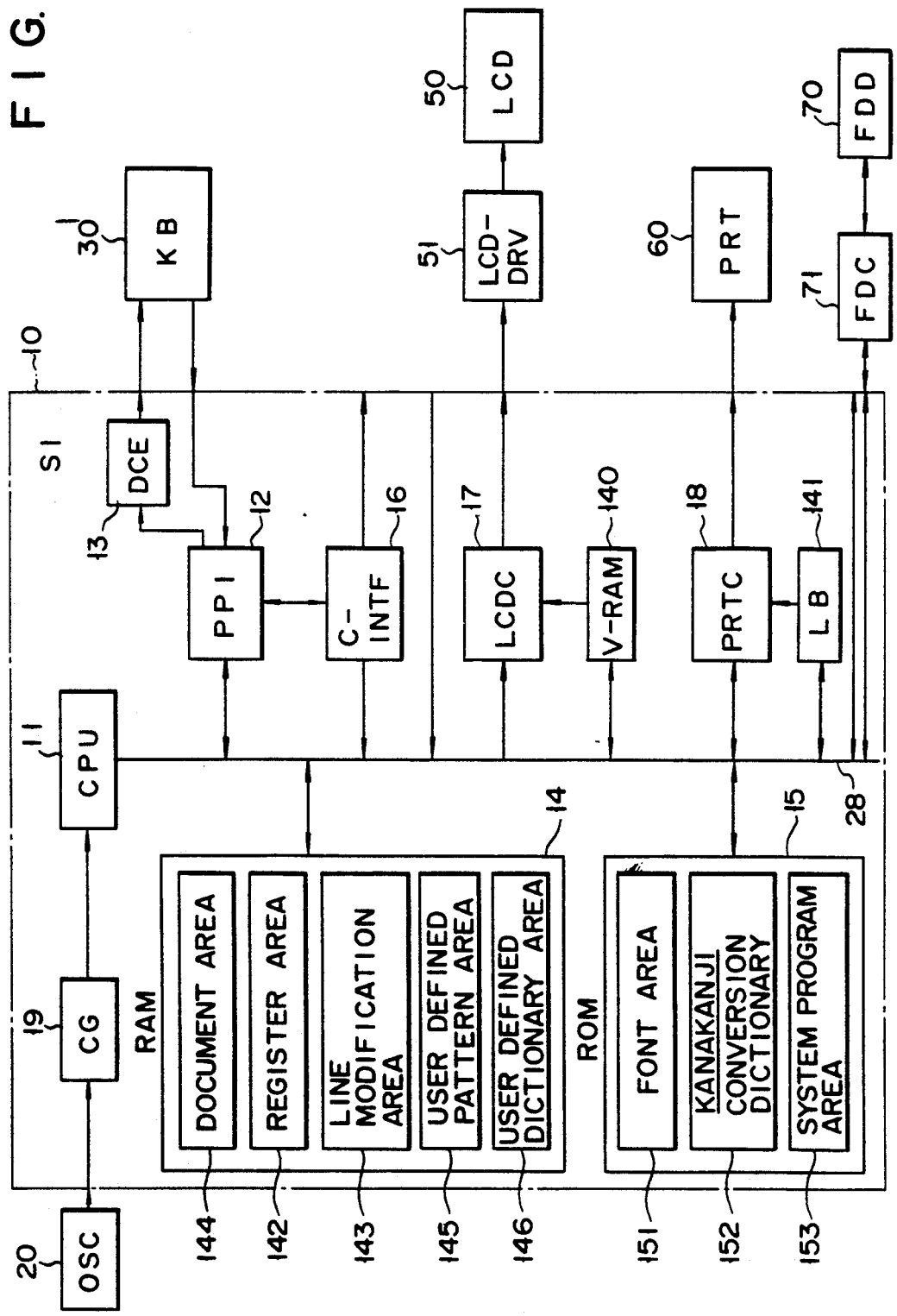

REGISTER AREA

| Field | Register |
|---|---|
| PAGE START LINE NUMBER | R0 |
| CLIPPING RANGE | R1 |
| CHARACTER POSITION | R2 |
| SEARCH LINE NUMBER | R3 |
| SEARCH END FLAG | R4 |
| LINE NUMBER | R5 |
| DISPLAY START POSITION | R6 |
| DISPLAY START LINE NUMBER | R7 |
| DISPLAY POSITION | R8 |
| PRINT IMAGE FLAG | R9 |
| LINE BUFFER LENGTH | R10 |
| NUMBER-OF-LINES | R11 |
| WRITE POINTER | R12 |
| COLUMN NUMBER | R13 |
| RETURN AMOUNT | R14 |
| Y POSITION | R15 |
| LINE MODIFICATION AREA | R16 |
| NUMBER-OF-DISPLAY-LINES | R17 |
| DOT POSITION / X POSITION | R18 |
| CHARACTER BUFFER | R19 |

F I G. 2

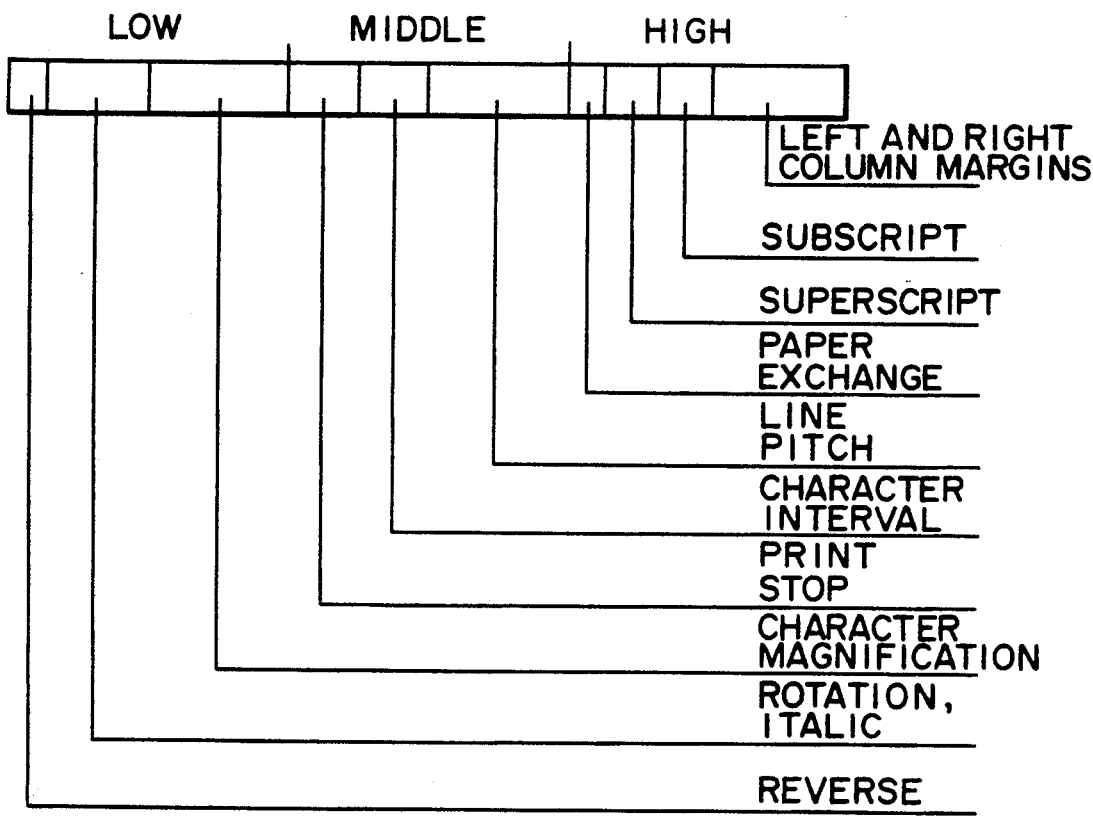
F I G. 3
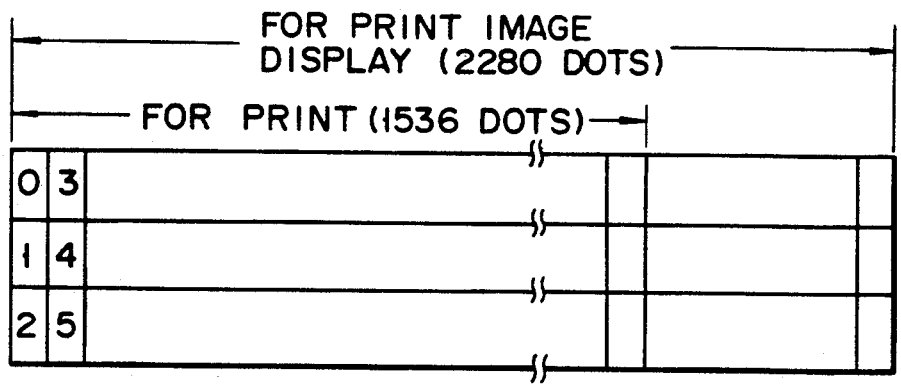
F I G. 4

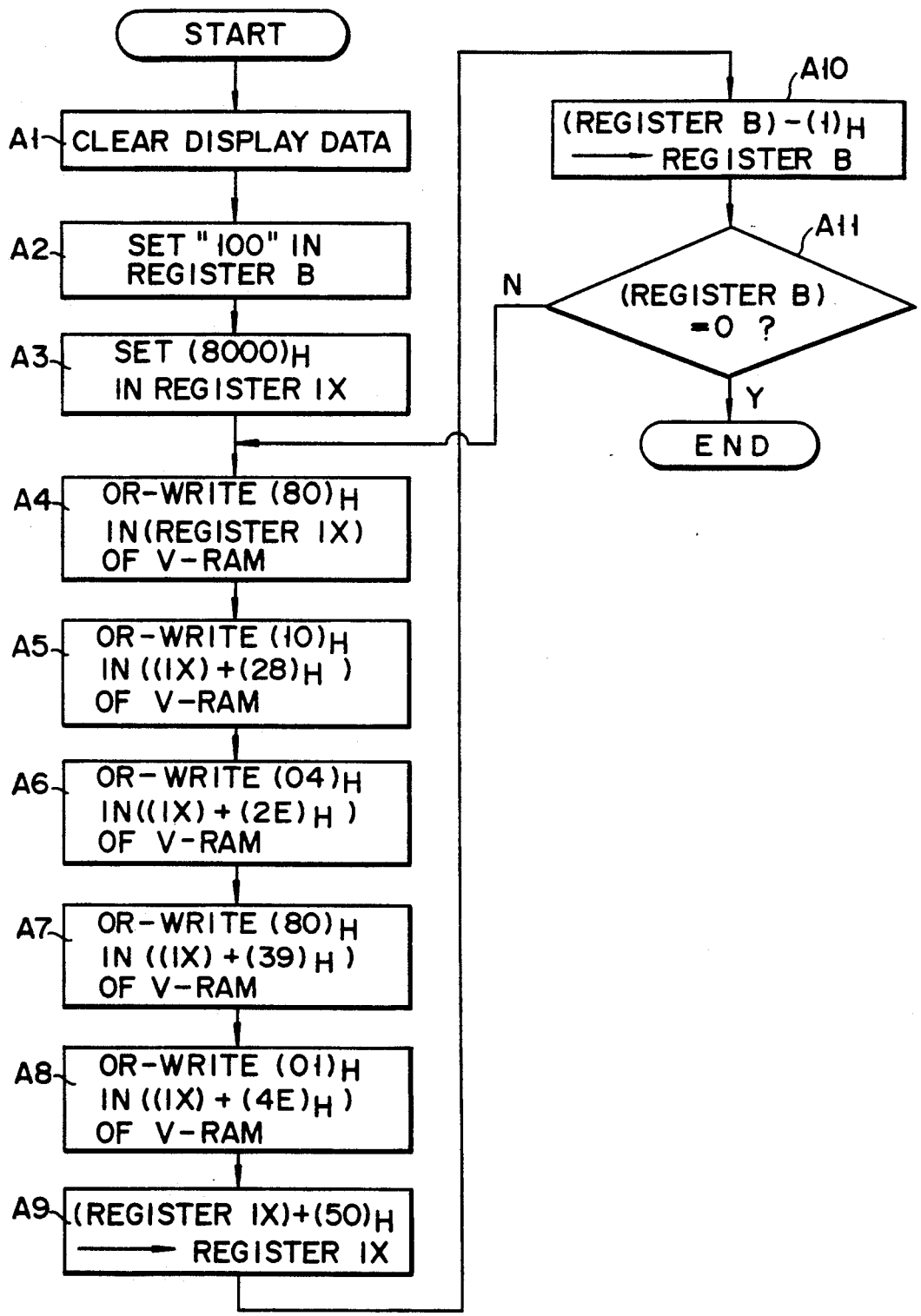
F I G. 7

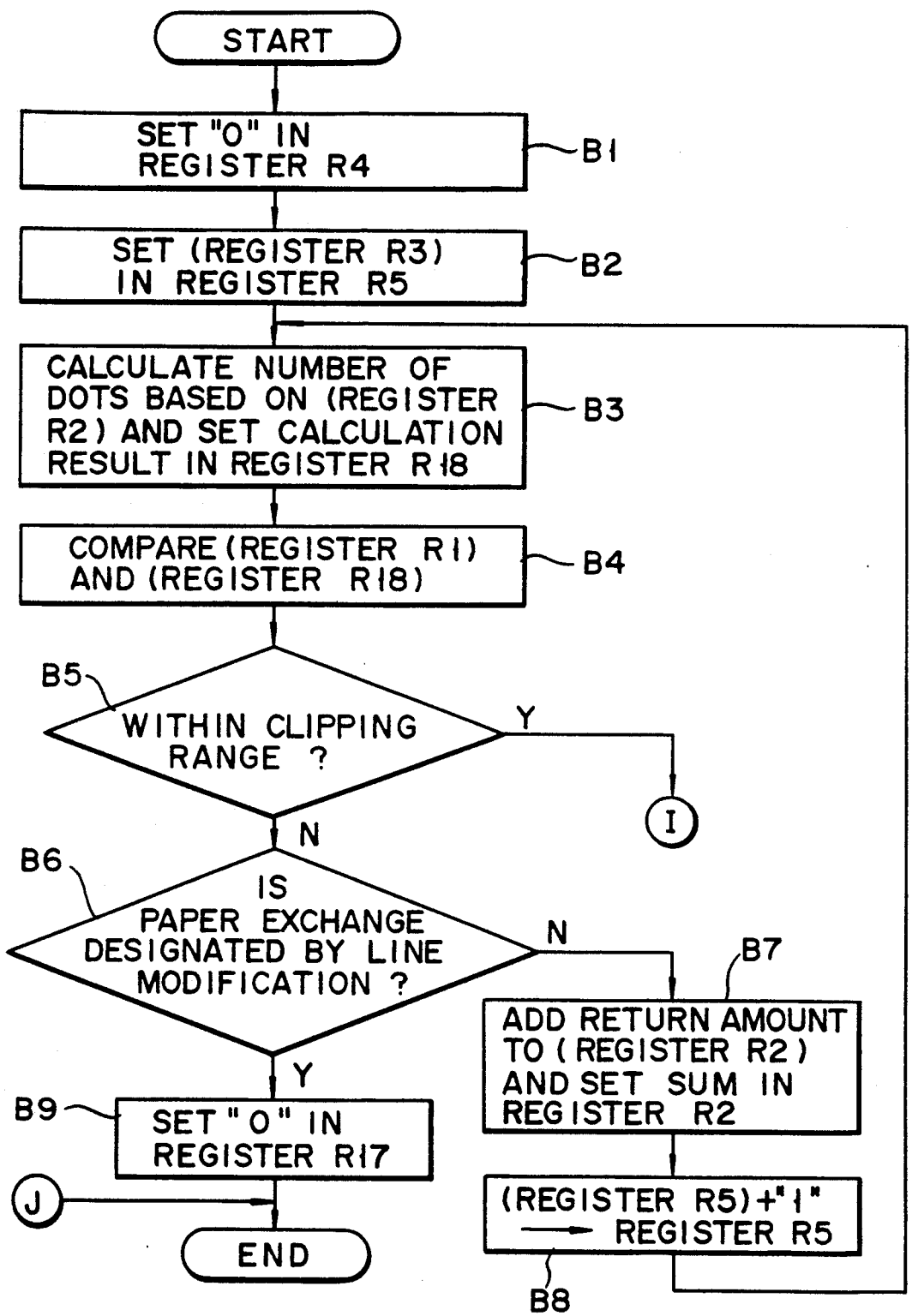
F I G. 9A

METHOD OF DISPLAYING REDUCED-LAYOUT AND APPARATUS FOR EMBODYING THE METHOD

This application is a continuation of application Ser. No. 07/075,062, filed July 16, 1987, now abandoned.

BACKGROUND OF THE INVENTION

The present invention relates to a reduced-layout display in a document processor and, more particularly, to a method which enables the satisfactory displaying of a print image as a reduced layout pattern, through effective use of a buffer memory of a print mechanism in a personal document processor, and to an apparatus embodying the method.

In recent models of word processors, an LCD (liquid crystal display) as a display mechanism, a floppy disk drive unit as a document file mechanism, and a thermal transfer printer as a print mechanism are used. In this type of word processor, the number of lines and columns which can be displayed on a screen at a time are limited as compared to those which can be printed on a printing sheet. Thus, the word processor has a layout display mechanism for layout-displaying a document image for one page by substituting one character into a symbol constituted by one or four dots.

However, when the conventional print image display method is used, the types of characters constituting a document cannot be discriminated. Upon layout display necessary for, e.g., editing a document, a character size, a character pitch, a return amount or value, and the like are left unclear. Since the width (paper size) of a paper sheet to be used cannot be recognized, an accurate layout on a paper sheet cannot be grasped. In order to grasp the accurate layout, the document must first be printed out.

SUMMARY OF THE INVENTION

The present invention has been developed in consideration of the above situation, and has as its object to provide a reduced-layout display apparatus which can easily confirm, on-screen, the layout of a print image on a printing sheet. The apparatus comprises:

a display buffer for storing pattern data to be displayed;

display section for displaying pattern data stored in the display buffer;

document storage means for storing code data corresponding to document data:

conversion means for converting the code data to print pattern data using a font;

boundary pattern developing means for, when in a print image display mode, developing boundary pattern data, corresponding to a boundary pattern indicating paper size capable of printing, in a first predetermined area of the display buffer, at a predetermined reduction ratio; and print data developing means for, when in the print image display mode, for reducing the print pattern data to a predetermined reduction ratio, and for developing the reduced print pattern data in a second predetermined area of the display buffer.

It is another object of the present invention to provide a method of performing reduced-layout display by means of which the layout of a print image on a printing sheet can be easily confirmed on a screen. The method comprises:

clearing pattern data stored in a display buffer, in response to the setting of a print image display mode;

developing boundary pattern data corresponding to a boundary pattern indicating paper size capable of printing in the display buffer at a predetermined reduction ratio in the print image display mode;

converting code data corresponding to document data to print pattern data using a font;

reducing the print pattern data to a predetermined reduction ratio, and developing the reduced print pattern data in a predetermined area of the display buffer, when in the print image display mode; and displaying the pattern data developed in the display buffer.

The procedure of developing the boundary pattern data includes developing the reduced boundary pattern data to be OR-written on data stored in the display buffer. The developing of the print pattern data includes developing the reduced print pattern data to be OR-written on data stored in the display buffer.

It is yet another object of the present invention to provide a reduced-layout display apparatus which can accurately display print pattern data of document data on a print sheet and can print the print pattern data in correspondence with the reduced-layout pattern. The apparatus comprises:

a display buffer for storing pattern data to be displayed;

display means for displaying the pattern data stored in the display buffer, when in a print image display mode;

document storage means for storing code data corresponding to the document data;

boundary pattern developing means for, when in the print image display mode, developing boundary pattern data corresponding to a boundary pattern indicating paper size capable of printing in a first predetermined area of the display buffer, at a predetermined reduction ratio;

print data developing means for, in the print image display mode and a print mode, converting the code data into print pattern data using a font, and for developing the converted print pattern data in a line buffer in accordance with a line modification;

reduced print pattern data developing means for, when in the print image display mode, reducing the print pattern data developed in the line buffer at the predetermined reduction ratio, and for developing the reduced print pattern data in a second predetermined area of the display buffer; and print means for printing the print pattern data developed in the line buffer, when in the print mode.

In this case, the line buffer temporarily stores pattern data for one line.

It is a further object of the present invention to provide a method for accurately reduced-layout displaying a print pattern data on a printing sheet. The method comprises:

clearing pattern data stored in a display buffer, in response to the setting of a print image display mode;

developing boundary pattern data indicating paper size capable of printing in the display buffer at a predetermined reduction ratio in the print image display mode;

converting code data corresponding to document data into print pattern data using a font;

developing the print pattern data in a line buffer, in accordance with a line modification of the print image display mode and a print mode;

reducing the print pattern data developed in the line buffer at the predetermined reduction ratio and developing the reduced print pattern data in a predetermined area in the display buffer, when in the print image display mode;

displaying the pattern data stored in the display buffer, when in the print image display mode; and printing the print pattern data developed in the line buffer, when in the print mode.

It is still another object of the present invention to provide a reduced-layout display apparatus which can divisionally display a reduced layout pattern of a print image. The apparatus comprises:

display buffer means for storing pattern data to be displayed;

display means for displaying the pattern data stored in the display buffer means, when in a print image display mode;

conversion means for converting the document data to print pattern data using a font;

clipping range detecting means for detecting the display range of the print pattern data, based on a display capacity of the display means, in accordance with a frame designation instruction in the print image display mode;

boundary pattern developing means for developing boundary pattern data indicating paper size capable of printing, in the display buffer means at a predetermined reduction ratio, when in the print image display mode;

print data developing means for developing print data within the detected display range in a line buffer, in accordance with a corresponding line modification in the print image display mode; and reduced print pattern data developing means for reducing the print pattern data developed in the line buffer at the predetermined reduction ratio, and developing the reduced print pattern data in a predetermined area of the display buffer means, when in the print image display mode.

The clipping range detecting means includes means for detecting the display range of the print pattern data corresponding to a frame immediately preceding a currently designated frame, in accordance with an immediately preceding frame designation instruction of a frame designation instruction, for detecting the display range of the print pattern data corresponding to a frame next to the currently designated frame, in accordance with a next frame designation instruction of a frame designation instruction, for detecting the display range corresponding to a last frame of an immediately preceding page, in accordance with the immediately preceding frame designation instruction, when a start frame of a page is currently designated, and for detecting the display range corresponding to a start frame of a next page, in accordance with the next frame designation instruction, when a last frame of a current page is designated.

As has been described above, according to a reduced-layout display apparatus of the present invention, a paper size can be displayed on a screen together with a reduced image of document data in a print image display mode. Thus, the layout of document data can be recognized in association with the paper size. In this case, the reduced image of the document data can be displayed together with a print disable range. An occupied area of a user defined character can be clearly expressed. When a size of a display screen is smaller than that for one page, a print image can be divisionally displayed.

BRIEF DESCRIPTION OF THE DRAWINGS

FIG. 1 is a block diagram showing the arrangement of a reduced-layout display apparatus according an embodiment of the present invention;

FIG. 2 is a view showing a map of a register area shown in FIG. 1;

FIG. 3 shows a format of line modification data;

FIG. 4 is a view showing a map of a line buffer shown in FIG. 1;

FIG. 7 is a flow chart for explaining an operation for displaying a paper size;

FIGS. 9A and 9B are flow charts for explaining an operation for discriminating the number of display lines according to a clipping range;

DETAILED DESCRIPTION OF THE PREFERRED EMBODIMENT

Figures 5, 8:
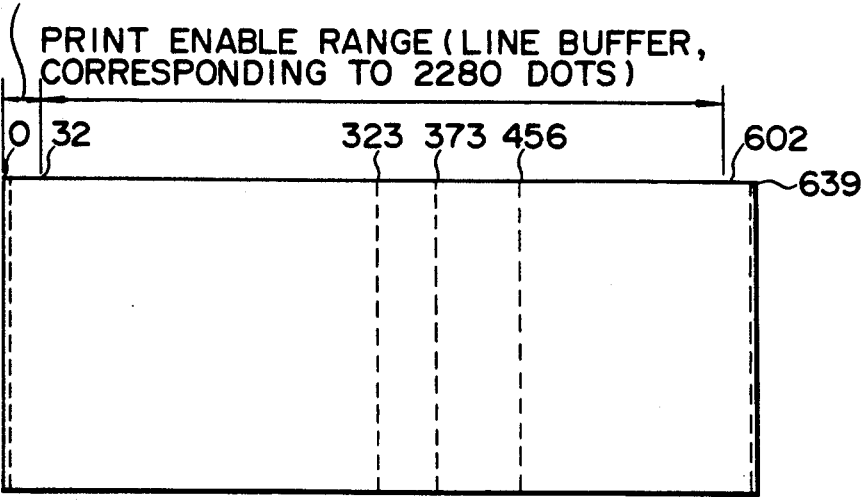
FIG. 5 is a view showing an address map of a V-RAM shown in FIG. 1.
FIG. 8 is a view showing a displayed paper size.

A reduced-layout display apparatus according to the present invention will be described hereinafter in detail with reference to the accompanying drawings.

First, the arrangement of an embodiment will now be described with reference to FIG. 1.

CPU 11 controls the entire apparatus in accordance with a system program written in system program area 153 in ROM 15 (to be described later). CPU 11 receives a clock signal from clock generator (CG) 19 for generating a clock signal in synchronism with oscillation of oscillator (OSC) 20. CPU 11 is a microprocessor Z80 or an equivalent.

Memory (RAM) 14 is connected to CPU 11 through system bus 28. RAM 14 has document area 144, register area 142, line modification area 143, user defined pattern area 145, user defined dictionary area 146, and the like. Document area 144 stores input document data in the form of codes. Register area 142 stores a register group shown in FIG. 2. They will be described later in detail. Line modification area 143 stores data indicating a line subjected to a line modification, and contents of the line modification data, as shown in FIG. 3. User defined pattern area 145 stores pattern data, defined by a user, and its code, excluding codes corresponding to predetermined patterns. Area 145 can be provided on a floppy disk, instead of in RAM 14. Thus, an area of RAM 14 can be effectively utilized. User defined dictionary area 146 stores a user defined character code group corresponding to a code group designated by a user, excluding a predetermined *kanakanji* conversion dictionary.

The register group of register area 142 will now be described with reference to FIG. 2. Register R0 is called a page start line number register, and stores a line position of document data in document area 144 for the start line of a page on which a cursor is currently displayed, upon display of a print image. Register R1 is called a clipping range register, and stores a dot position of a boundary near a start line upon display of a print image for each page. Register R2 is called an character position register and is used for searching a display range.

Register R3 is called a search line number register, and stores a line number on document data as an object of detection processing upon detection of a clipping range. Register R4 is called a search end flag register, and is used for discriminating end of search. Register R5 is called a line number register, and is used as a work register for indicating the number of lines upon detection of the clipping range. Register R6 is called a display start position register, and is used for storing a display start position in a print image display mode. Register R7 is called a display start line number register, and is used for indicating a line number of document data within the clipping range on document area 144.

Register R8 is called a display position register, and is used for providing a return amount when a print image is displayed on LCD 50 or is printed. Register R9 is called a print image flag register, and is set in the print image display mode. Register R10 is called a line buffer length register, and stores a length of a line buffer. Register R11 is called a number-of-line register, and serves as a work register used for detection processing of the clipping range.

Register R12 is called a write pointer register, and is used for indicating a dot position in a column direction of a character written in the line buffer. Register R13 is called a column number register, and is used for indicating a column number of document data stored in document area 144. Register R14 is called a return amount register, and stores a return amount between adjacent lines of document data currently stored in document area 144. Register R15 is called a Y position register, and stores a Y-position of the V-RAM. Register R16 has a three-byte length and is called a line modification area register. Register R16 stores line modification data corresponding to a line number of interest read out from line modification area 143.

Register R17 is called a number-of-display-line register, and stores the number of possible display lines within the clipping range. Register R18 is called a dot position/X position register, and is used for indicating a dot position of a display line or an X-position of the V-RAM. Register R19 is called a character buffer register, has a 72-byte data length, and stores pattern data for one character. In this embodiment, one block is constituted by 24-by-24 dots, and 24×3, i.e., 72 bytes are required for storage in units of bytes.

Each line modification data stored in line modification area 143 has a format shown in FIG. 3. Referring to FIG. 3, line modification data consists of low, middle, and high, i.e., three bytes. In the line modification data, attributes such as reverse, rotation/ italic, character magnification, print stop, character pitch, line pitch, paper exchange, superscript, subscript, and left and right column margins are designated. When "reverse" is designated, a hollow character with a black edge is printed. When "rotation/italic" is designated, a printed character is rotated or inclined. When "character magnification" is designated, a width of a character in a designated line is doubled in a horizontal direction, in a vertical direction, or in both vertical and horizontal directions.

When "superscript" is designated, a character in a line of interest is printed as a superior letter with respect to a character in an immediately preceding line. More specifically, when "superscript" is designated, like $2^3$, a character in a line including "3" is printed as a superior letter with respect to a character in an immediately preceding line, e.g., 2. When "subscript" is designated, a character in a line of interest is printed as an inferior letter with respect to a character in an immediately preceding line, like $H_2O$. When "print stop" is designated, a print operation is stopped in the line. Various character pitches can be selected. For example, a ¼ character, a ¼ character, or the like can be selected. As a line pitch, a ¼ character, a ⅜ character, a ½ character or the like can be selected.

When "paper exchange" is selected, after the line is printed, the print operation is temporarily stopped in order to exchange a paper sheet. "Paper exchange" can allow pagenation. When "left and right column margin" is designated, the print operation is started from position offsets to the right or to the left from a predetermined position on a paper sheet by a designated number of columns.

Font area 151 of ROM 15 stores various types of fonts. One character of document data stored in document area 144 is read out, and is patterned in accordance with the font stored in font area 151. Then, the patterned character data is stored in character buffer register R19. *Kanakanji* conversion dictionary area 152 is adopted to convert a *hiragana* code string input through keyboard 30 into a *kanji* code string.

In addition to RAM 14 and ROM 15, V-RAM 140 and LB 141 are arranged to store data. FIG. 14 shows the address format of LB 141. LB 141 can store data corresponding to 2280 dots. However, data corresponding to 1536 dots are used for printing in practice. Since one block, i.e., one character is displayed in a 24-by-24 dot matrix, 1536 dots correspond to 64 characters. In FIG. 4, three subsequent addresses are assigned in the vertical direction, and the next three subsequent addresses follow in the column direction.

Address assignment in V-RAM 140 is shown in FIG. 5. The start address is $(8000)_H$, and the end address is $(BF8F)_H$. Thus, 640 dots in the horizontal direction, e.g., 80 bytes and 200 dots in the vertical direction can be formed on LCD 50. Addressing is performed such that a value is updated by 80 in the horizontal direction, and 100 dots in the vertical direction to obtain the next address position. Subsequent to an address of the line, the next line is designated as a second line ahead of the start line. When the longitudinal direction of V-RAM 140 is designated by the content of register R15, it can be sequentially designated. This also applies to register R18. Therefore, when the content of register R15 is "3" and the content of register R18 is "2", $(80A1)_H$ is designated.

Peripheral control circuit (PPI) 12 is connected to CPU 11 through system bus 28. One of three ports outputs 4-bit keyboard scan data, and one of the remaining ports receives a return signal from keyboard 30. The remaining port is connected to communication interface 16. The output keyboard scan data is decoded by decoder (DCE) 13, and is supplied to keyboard 30 as 9 types of scan signals. Keyboard 30 generates a keyboard return signal in accordance with a scan signal when keys are operated, and outputs the signal to PPI 12. The keyboard return signal is encoded by PPI 12, and is discriminated and processed by CPU 11. For example, if the keyboard return signal indicates code data, it is stored in document area 144 of RAM 14. If the signal indicates a command, various sections including PPI 12 are controlled thereby. Communication interface (C-INTF) 16 exchanges document data (character code string) with an external apparatus under the control of CPU 11.

Liquid crystal display controller (LCDC) 17 is connected to CPU 11 through system bus 28, and is also connected to liquid crystal display (LCD) 50 through liquid crystal display driver (LCD-DRV) 51. LCDC 17 is directly connected to the V-RAM. Image data transferred by CPU 11 is written in V-RAM 140. LCDC 17 reads out image data written in V-RAM 140, and causes LCD-DRV 51 to display the image data on LCD 50.

Printer controller (PRTC) 18 is connected to CPU 11 through system bus 28, and is also connected directly to printer (PRT) 60 and line buffer (LB) 141. Image data transferred by CPU 11 is written in LB 141. PRTC 18 reads out the image data written in LB 141 and prints the image data by PRT 60.

Floppy disk controller (FDC) 71 is connected to CPU 11 through system bus 28, and is also connected directly to floppy disk drive (FDD) 70. Document data written in document area 144 of RAM 14 is read out by CPU 11, and is transferred to FDC 71. FDC 71 causes FDD 70 to write the transferred document data in a floppy disk. FDC 71 causes FDD 70 to read out stored document data from the floppy disk. The readout document data is stored in document area 144 of RAM 14 under the control of CPU 11. At this time, line modification data added to document data is also read out, and is stored in line modification area 143.

Clock generator 19, CPU 11, PPI 12, DCE 13, C-INTF 16, LCDC 17, V-RAM 140, PRTC 18, and LB 141 can be constituted by an LSI, and are called super integration 10.

A reduced-layout display operation of a print image will be described with reference to FIGS. 6A to 6D.

CPU 11 causes PPI 12 to output a scan signal to keyboard 30 through decoder 13. A key signal which is generated upon key operation of keyboard 30 is converted into codes by PPI 12. The converted codes are discriminated by CPU 11. If it is determined that the converted codes are character codes, they are sequentially stored in document area 144 of RAM 14. Thereafter, if a *kanji* conversion instruction is input to designate part of the stored code string, the designated part of the code string is subjected to *kanakanji* conversion processing with reference to *kanakanji* conversion dictionary 152 and user defined dictionary 146. The converted code, i.e., subjected to the *kanakanji* conversion processing, is written at a previously designated position of the document data, and the subsequent code group is subjected to appropriate positioning processing. The document data constituted by the converted *kanji* code string and nonconverted *kana* code string is stored in document area 144.

When a document is input and is displayed, a character pitch, a line pitch, and a character size are preset. The codes stored in document area 144 are read out character by character, are converted into pattern data with reference to fonts stored in font area 151, and are stored in register R19. Thereafter, pattern data corresponding to a readout character is developed at a corresponding position on V-RAM 140 in accordance with the preset character pitch, line pitch, and character size. The developed pattern is read out by LCDC 17, and is displayed on LCD 50 in a 40 columns ×10 lines (in a reduced display mode, 80 columns ×20 lines) character alignment at maximum. Edit processing can be applied to the displayed document pattern data.

If a print image display key on keyboard 30 is depressed before document data stored in document area 144 corresponding to the displayed pattern data as described above is printed, CPU 11 determines that a print image display mode instruction is designated, and the print image display mode is set. Then, the flow charts shown in FIGS. 6A to 6D are executed.

In step S1, a start line of a page on which a cursor is positioned when the print image display key is depressed is set in page start line number register R0. More specifically, the content of line modification area 143 is referred to, thereby detecting a line number, for which "paper exchange" is designated, before a line along which the cursor is located when the print image display key is depressed. A line number next to the detected line number of the document data is set in register R0. In step S2, the content of clipping range register R1 is set to "0".

Thereafter, paper width scale display processing is executed in step S3. This processing is executed in accordance with the flow chart shown in FIG. 7.

In FIG. 7, in step A1, the entire screen is cleared. More specifically, the content of V-RAM 140 is cleared. In step A2, data "100" is set in register B as an internal register of CPU 11. In step A3, data indicating the start address of V-RAM 140, i.e., $(8000)_H$ is set in register IX as an internal register of CPU 11.

In step A4, data read out from V-RAM 140 based on data retained in register IX and data $(80)_H = (1000\ 0000)_2$ are ORed. Since the content of V-RAM 140 is cleared, readout data is $(00)_H$. The ORed result is written at an address indicated by register IX. As a result, a dot is written at a point indicated by "0" in FIG. 8.

In step A5, data is read out using a sum of data retained in register IX and data "40" as an address of V-RAM 140. The readout data and data $(10)_H = (0001\ 0000)_2$ are ORed, and the ORed result is written using the above sum as the address. Thus, a dot is written at a 323rd-bit position in the column direction.

In step A6, data is read out using a sum of data retained in register IX and data "46" as an address of V-RAM 140. The readout data and data $(04)_H = (0000\ 0100)_2$ are ORed, and the ORed result is written using the above sum as the address. Thus, a dot is written at a 373th-bit position in the column direction.

In step A7, data is read out using a sum of data retained in register IX and data "57" as an address of V-RAM 140. The readout data and data $(80)_H = (1000\ 0000)_2$ are ORed, and the ORed result is written using the above sum as an address. Thus, a dot is written at a 456th-bit position in the column direction.

In step A8, data is read out using a sum of data retained in register IX and data "79" as an address of V-RAM 140. The readout data and data $(01)_H = (0000\ 0001)_2$ are ORed, and the ORed result is written using the above sum as an address. Thus, a dot is written at a 639th-bit position in the column direction. By the above-mentioned paper width scale display processing, dots are written at predetermined positions of addresses $(8000)_H$ to $(804F)_H$ of V-RAM 140.

In step A9, data "80" is added to the content of register IX, and the sum is stored in register IX. Thus, the next line of interest corresponds to Y position 101, i.e., addresses $(8050)_H$ to $(809F)_H$ with reference to FIG. 8. Thereafter, in step A10, the content of register B is decremented by "1". It is checked in step A11 if the content of register B is "0". If Y in step A11, the paper width scale display processing is ended. If N in step A11, step A4 is again executed.

Upon execution of the above-mentioned processing steps, a paper width is displayed on V-RAM 140 by a dotted line.

After the paper width scale is displayed, processing for displaying a print image of a page start portion is executed. First, a display range is detected, and thereafter, the detected range is displayed on LCD 50.

In step S4, data "4" is set in character position register R2 in units of 1/120 inch. In this invention, a 1/120 inch corresponds to 1.5 dots. As will be described later, a print image is displayed to be reduced to $\frac{1}{4} \times \frac{1}{4}$. Therefore, this corresponds to a 1.5-dot offset. In step S5, the content of register R0 is set in search line number register R3. Note that in the following flow charts, a register name in parentheses indicates its content. In step S6, processing for detecting the number of display lines from a clipping range is executed. The processing is shown in FIGS. 9A and 9B in detail.

Figure 9B:
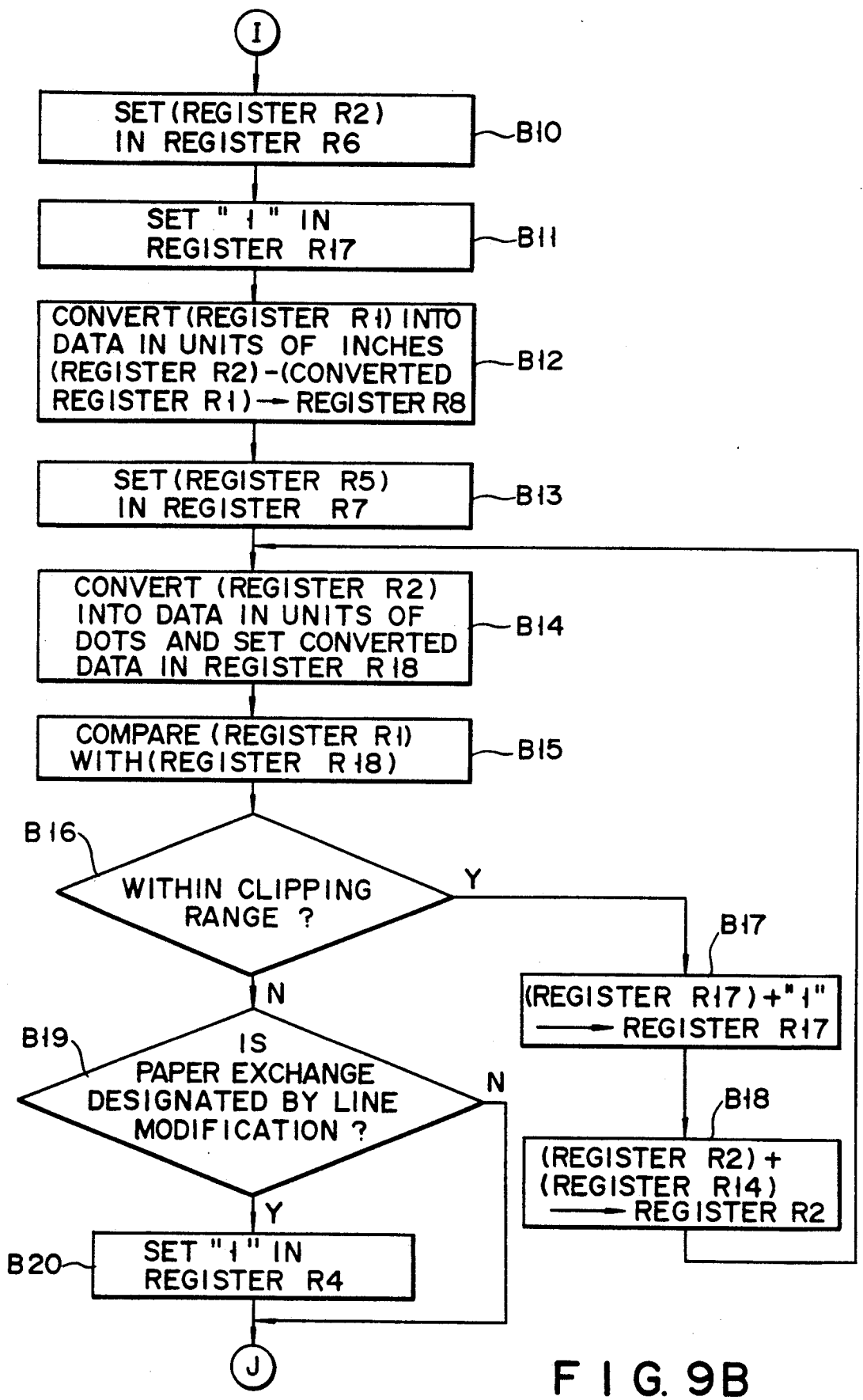

Referring to FIGS. 9A and 9B, in the detection processing of the number of display lines from the clipping range, the upper end of the clipping range is detected in a loop consisting of steps B3 to B8, and then, the lower end of the clipping range is detected in a loop consisting of steps B14 to B18. If no upper end of the clipping range is detected in the loop of steps B3 to B8 and a line modification of paper exchange is detected, the number of display lines is set to be "0".

First, data "0" is set in search end flag register R4 in step B1. In step B2, the content of register B3 is set in line number register R5. The preset line pitch is stored in return amount register R14. When a line designated by the content of register R5 is line-modified, the corresponding line modification data is read out from line modification area 143, and is written in register R16. The return amount designated by the line modification data is stored in register R14. When the line is not line-modified, the return amount in register R14 is not changed.

In steps B3 to B5, the upper end of the clipping range is detected. More specifically, an inch position of a lower end of document data of a line number designated by register R5 is obtained by adding the contents of registers R2 and R14. It is checked if the document data is subjected to, e.g., double-width modification or superscript modification by the line modification data. In particular, in the case of superscript modification, a line to be superscript-modified has been already superscript-modified. In this case, the final display position of the superscript-modified line is determined. In the case of superscript modification, the superscriptmodified line is printed above by a 1/12 inch from an original line which is subjected to the superscript modification. In the case of subscript modification (to be described later), a subscript-modified line is printed below by a 1/12 inch from an original line to be subjected to superscript modification. Therefore, a lower end of an enlarged line or a superscript-modified line is obtained in units of inches. The obtained inch position is converted to data in units of dots, and is stored in register R18.

Figure 10:
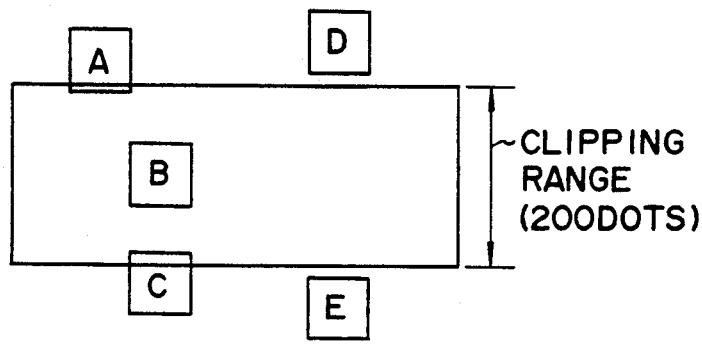
FIG. 10 is a view showing the clipping range.

In step B4, the content of register R18 is compared with that of register R1. It is checked in step B5 if a line of interest, i.e., a line designated by register R5, is present within the clipping range. In this decision step, as shown in FIG. 10, it is determined that A is present in the clipping range in addition to B. It is determined that D is out of the clipping range. If Y in step B5, step B10 is executed. If N in step B5, step B6 is executed. It is checked in step B6 if "paper exchange" is designated by the line modification data. If Y in step B6, it is determined that a page is updated, and detection processing is interrupted. Therefore, data "0" is set in register R17 in step B9.

If N in step B6, step B7 is executed, and the content of register R2 is updated in accordance with the content of register R14 based on the line modification data of a line designated by the content of register R5. Thereafter, the preset line pitch is stored in register R14. In step B8, the content of register R5 is incremented by "1". The line modification data for a line designated by the content of register R5 is read out and is set in register R16. Thereafter, the flow returns to step B3.

If Y in step B5, step B10 is executed. In step B10, the content of register R2 is set in register R6. In step B11, data "1" is set in register R17. In step B12, the content of register R1 is converted to data in units of inches. In this embodiment, since 1.5 dots correspond to a 1/120 inch, the data is converted based on this. The converted inches are subtracted from the content of register R2. The difference is stored in register R8. Thus, like A shown in FIG. 10, the number of display dots when a character is to be partially displayed is stored in register R8. In step B13, the content of register R5 is set in register R7.

In the loop of steps B14 to B18, the lower end of the clipping range is detected, i.e., the number of possible display lines is obtained. In step B14, the content of register R2 is converted into data in units of dots, and the converted data is set in register R18. In steps B15 and B16, the contents of registers R1 and R18 are compared with each other to check the clipping range, taking account of the line modification data. More specifically, the clipping range is detected below the content of register R1 by 200 dots in the print image display mode, i.e., 800 dots for print pattern data. This state is shown in FIG. 10. Referring to FIG. 10, of course, data B falls within the clipping range, and it is also determined that data C falls within the clipping range. However, it is determined that data E is out of the clipping range.

If Y in step B16, step B17 is executed, and the content of register R17 and register R5 are incremented by "1". This means that the number of display lines is incremented by "1", and that the line modification data for a line designated by the content of register R5 is read out and is set in register R16. In step B18, the content of register R2 is added to the return amount as the content of register R14. Thereafter, step B14 is executed again, and this loop is repeated until N is obtained in step B16.

If N is obtained in step B16, step B19 is executed to check if "paper exchange" is designated by register R16. If N in step B19, processing is completed. If Y in step B19, step B20 is executed, and data "1" is set in the content of register R4. By the above processing, a display start inch character position is stored in register R6, a display start line number is stored in register R7, and the number of display lines is stored in register R17.

When detection processing of the number of display lines from the clipping range is completed in step S6, step S7 is executed to check if the content of register R17 is "0". If the content of register R17 is "0", this means that there is no document data to be displayed. If Y in step S7, step S13 is executed. If N in step S7, step S8 is executed, and the content of register R17 is set in register BC in CPU 11. In step S9, the content of register R7 is set in register DE in CPU 11. In step S10, display processing onto LCD 50 is executed. This processing is shown in detail in the flow charts of FIGS. 11A to 11C.

Figure 11A:
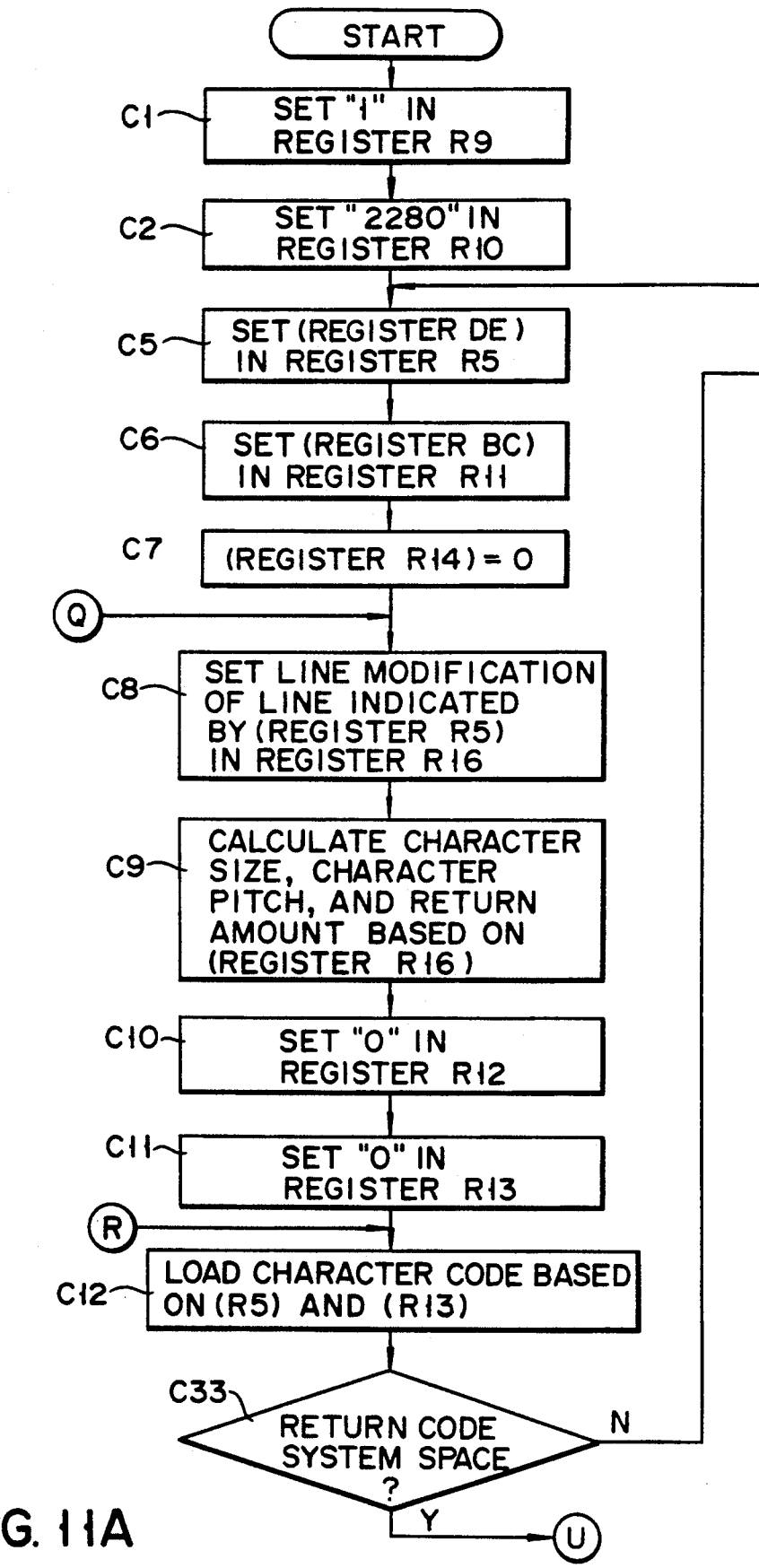
FIGS. 11A to 11C are flow charts for explaining an operation for displaying a reduced-layout pattern of a print image on an LCD and printing the print image.

In FIG. 11A, in step C1, data "1" is set in register R9. In step C2, data "2280" is set in register R10. In this embodiment, since one character is expressed by a 24-by-24 dot matrix, data "2280" corresponds to 95 characters. In step C5, the content of register DE is set in register R5. In step C6, the content of register BC is set in register R11. In step C7, data "0" is set in the content of register R14.

In step C8, line modification data corresponding to a line designated by the content of register R5 is read out from line modification area 143, and is set in register R16. When there is not the line modification data, the preset valves for a character size, character pitch, and a return amount are set in register R16. In step C9, a character size, character pitch, and a return amount are calculated from the content of register R16. The return amount is stored in register R14. In step C10, data "0" is set in register R12. In step C11, data "0" is set in register R13. The above processing corresponds to initialization in the print image display mode, and steps C5 to C11 are also executed in the print mode.

In step C12, a character code is read out from document area 144 in accordance with the contents of registers R5 and R13. It is checked in step C33 if the readout code is a return code or a system space code. The system space code is generated not by user's input but by CPU 11. If Y in step C33, step C23 is executed. If N in step C33, step C13 is executed. It is checked in step C13 if the loaded character code is a user defined pattern code. If Y in step C13, step C14 is executed. If N in step C13, step C16 is executed. It is checked in step C14 if the content of register R19 is "1", i.e., whether the print image display mode or the print mode is selected. If the print image display mode is selected, step C15 is executed, and pattern data consisting of all "1" 24-by-24 dots is written in register R19. Thereafter, step C18 is executed. If N in step C14, i.e., if the print mode is selected, step C17 is executed, and the corresponding pattern data is read out from the floppy disk through FDC 71 and FDD 70, and is written in register R19. Thereafter, step C18 is executed. If N in step C13, pattern data obtained referring to the fonts of font area 151 is written in register R19 in step C16.

In step C18, the pattern data stored in register R19 is modified in accordance with the line modification data stored in register R16 and is stored in LB 141. Thereafter, in step C19, a dot size of the character based on the content of register R16 is added to the content of register R12. It is checked in step C20 if the content of register R10 is larger than that of register R12. If N in step C20, step C23 is executed. If Y in step C20, step C21 is executed, and the number of dots of the character pitch based on the content of register R16 is added to the content of register R12. In step C22, the content of register R13 is incremented by "1". Thereafter, step C12 is executed again. In the loop of steps C12 to C20 and step C33, image data for one line is stored in LB 141.

If N is obtained in step C20, i.e., if image data for one line is stored in LB 141, step C23 is executed. It is checked in step C23 if the content of register R9 is "1", i.e., if the print image display mode or the print mode is selected. If N is determined in step C23, return processing of printer 60 is executed by PRTC 18 in accordance with the content of register R14. Subsequently, in step C32, print processing of pattern data stored in LB 141 is executed by PRTC 18. Thereafter, step C26 is executed.

If Y is obtained in step C23, i.e., if the print image display mode is selected, data is written V-RAM 140 in step C25. The write processing to the V-RAM is shown in detail in the flow charts of FIGS. 12A to 12C.

Figure 12A:
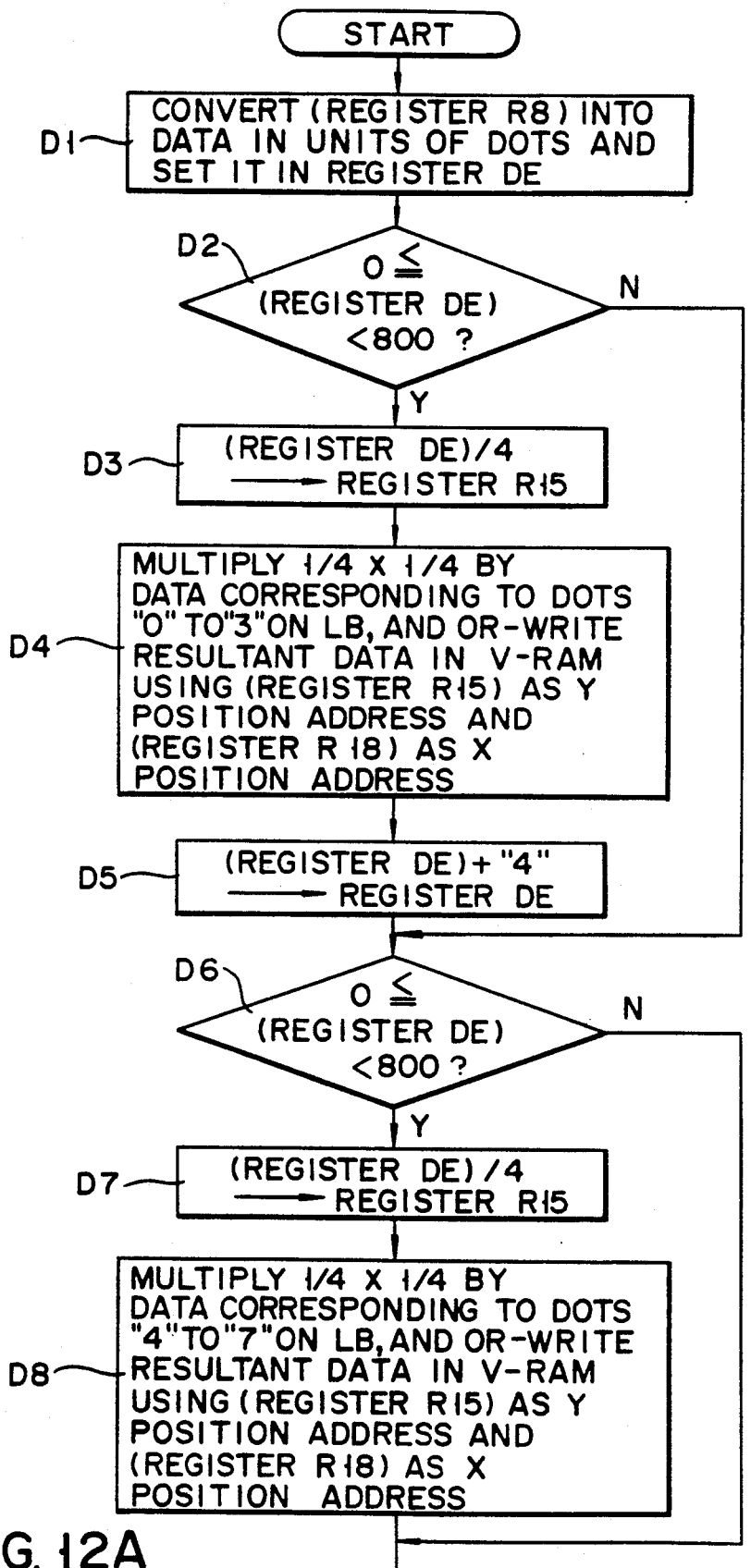
FIGS. 12A to 12C are flow charts for explaining an operation for writing the reduced-layout pattern of a print image in the V-RAM.
Figure 12B:
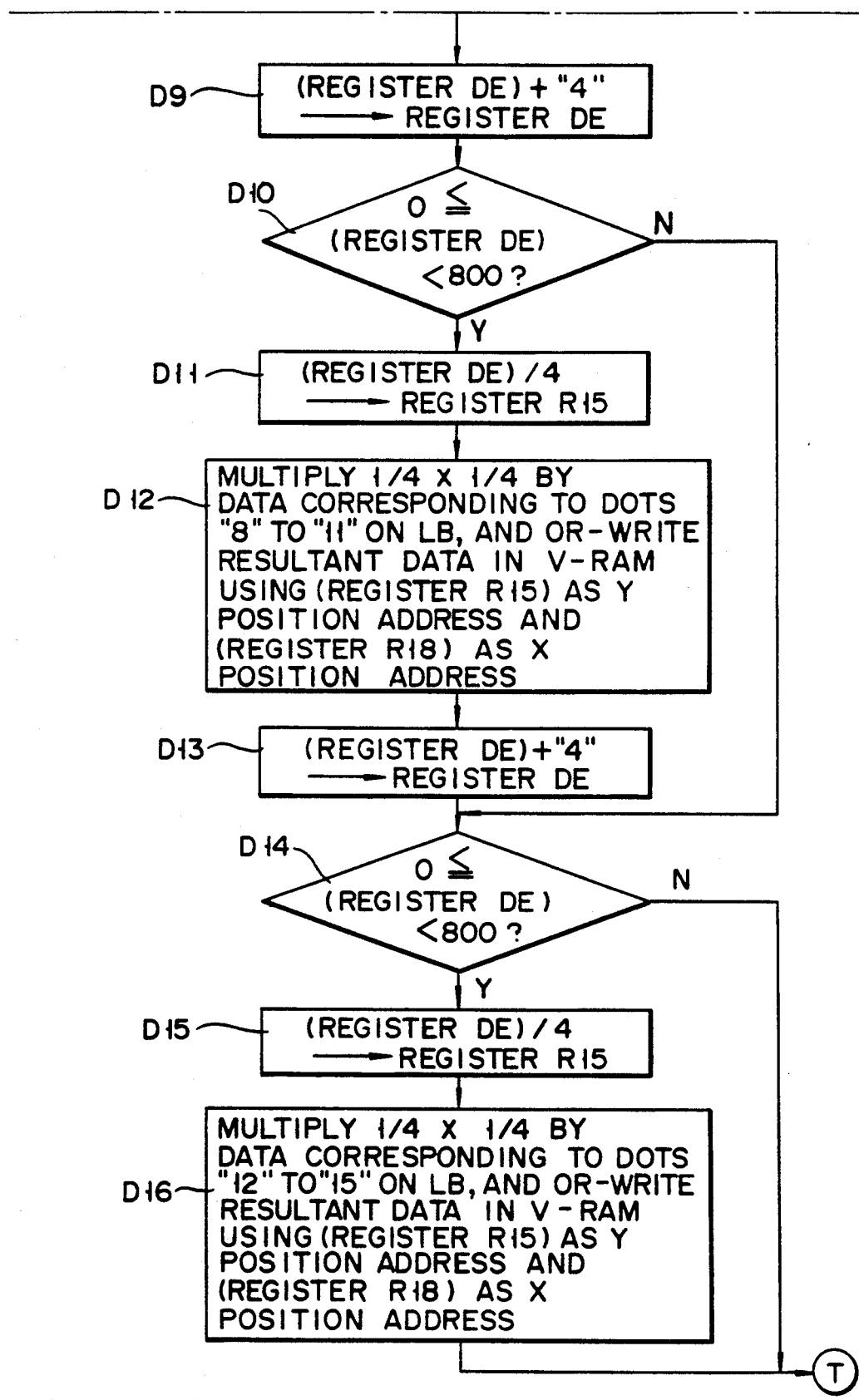
Figure 12C:
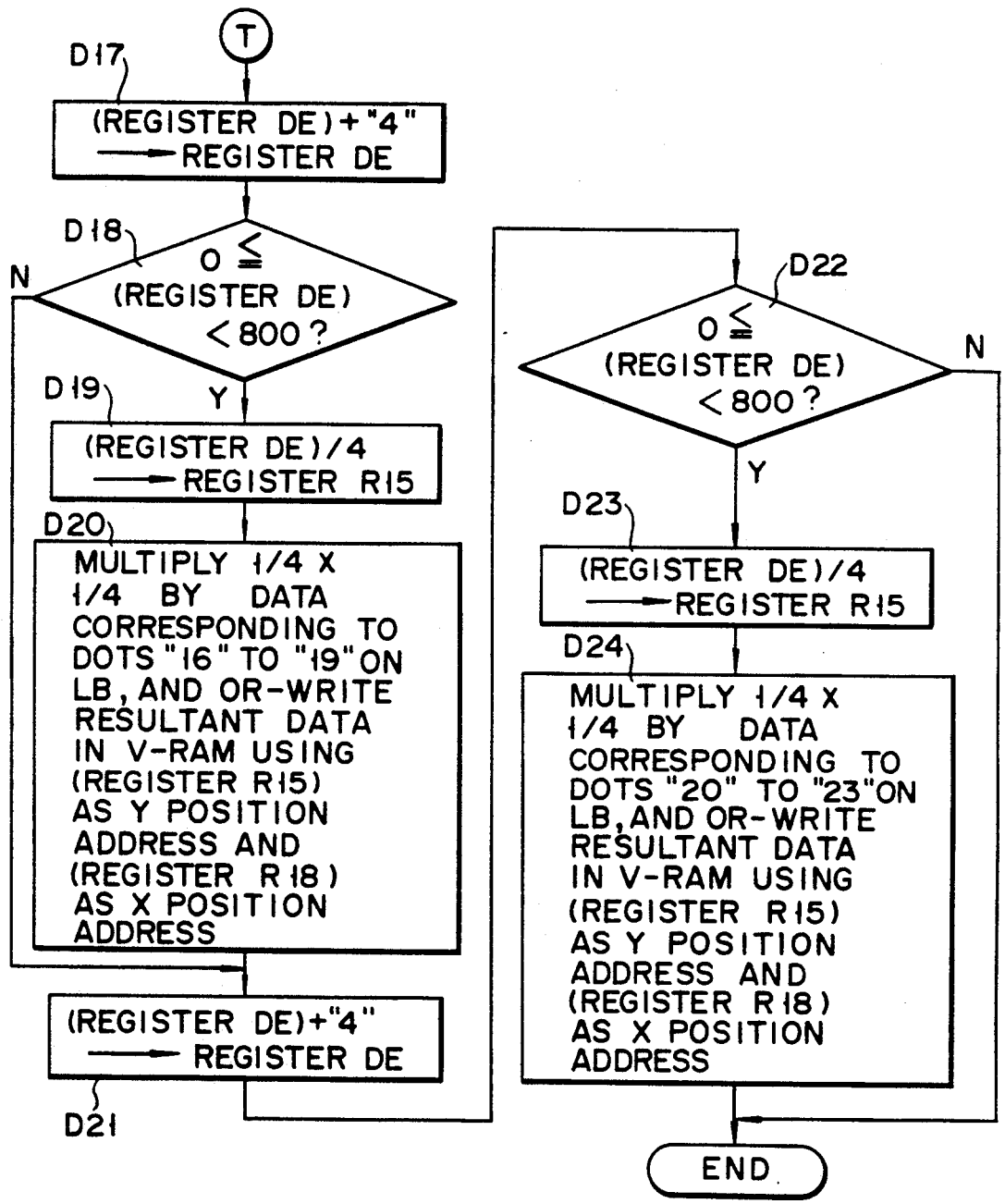

In step D1 in FIG. 12A, the content of register R8 is converted into data in units of dots. For data A shown in FIG. 10, inch data indicating a portion falling outside the clipping range is stored with a "−" sign in register DE. It is checked in step D2 if the content of register DE is equal to "0" or is larger than "0" and is smaller than 800. In the print image display mode, actually displayed pattern data is multiplied with $\frac{1}{4} \times \frac{1}{4}$ and is displayed on a screen. In addition, since one frame corresponds to 200 dots, it is checked if the content is smaller than 800. If N in step D2, step D5 is executed. If Y in step D2, step D3 is executed. In step D3, a value corresponding to $\frac{1}{4}$ the content of register DE is set in register R15. In step D4, upper dots "0" to "3" are designated from the pattern data stored in LB 141, and $\frac{1}{4} \times \frac{1}{4}$-reduced pattern data is written in V-RAM 140. More specifically, one dot, e.g., a upper left dot, is selected from a 4×4 dot matrix constituted by dots "0" to "3" in the vertical direction of the pattern data and four dots in the horizontal direction. When 8 dots are selected in this manner, the selected dots are stored at addresses of V-RAM 140 designated in accordance with the contents of registers R15 and R18. This processing is repeated until line end. Thereafter, in step D5, data "4" is added to the content of register DE.

Thereafter, the same processing as in steps D2 to D5 is repeated for dots "4" to "7" in the vertical direction of the pattern data stored in LB 141 in steps D6 to D9, for dots "8" to "11" in the vertical direction of the pattern data stored in LB 141 in steps D10 to D13, for dots "12" to "15" in the vertical direction of the pattern data stored in LB 141 in steps D14 to D17, and for dots "16" to "19" in the vertical direction of the pattern data stored in LB 141 in steps D18 to D21. Thereafter, the same processing as in steps D2 to D4 is repeated for dots "20" to "23" in the vertical direction of the pattern data stored in LB 141 in steps D22 to D24. With the above processing, the pattern data stored in LB 141 is reduced, and is developed in V-RAM 140.

Figure 13:
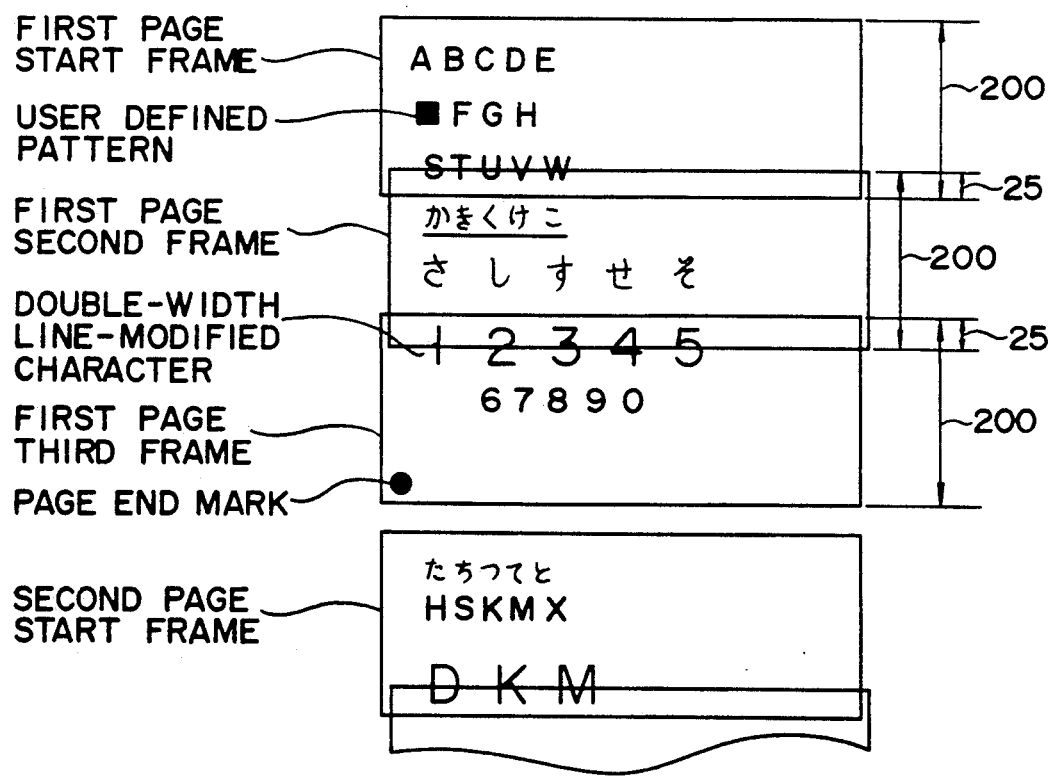
FIG. 13 is a view showing a reduced-layout display state of a print image.

With the above processing, when characters to be displayed in print image display mode are "STUVW" as shown in FIG. 13, the characters within the clipping range are displayed as follows. Since register R8 stores inch data corresponding to the number of dots falling outside the clipping range of "STUVW" in step B12, the content is converted into data in units of dots in step D1. For example, if 16 dots out of 24 dots fall outside the clipping range, steps D1 to D17 are skipped, and step D18 and the subsequent steps are executed. Thus, lower 8-dot data is displayed.

When the write processing in V-RAM 140 is completed, step C25 is executed, and the content of register R8 is added to that of register R14. The sum is again stored in register R8. Thus, the inch position of the next line is stored in register R8. Thereafter, step C26 is executed. In step C26, a return amount designated by the line modification data is set in register R14. In step C27, the content of register R5 is incremented by one. Subsequently, in step C29, the content of register R11 is decremented by "1". Thereafter, it is checked in step C30 if the content of register R11 is "0", i.e., if the print image display operation or the print operation is completed. If N in step C30, the flow returns to step C8. If Y in step C30, the write processing to V-RAM 140 is completed. In this manner, as shown in FIG. 13, a first-page start frame in the print image display mode is displayed, as shown in FIG. 13.

Figure 6A:
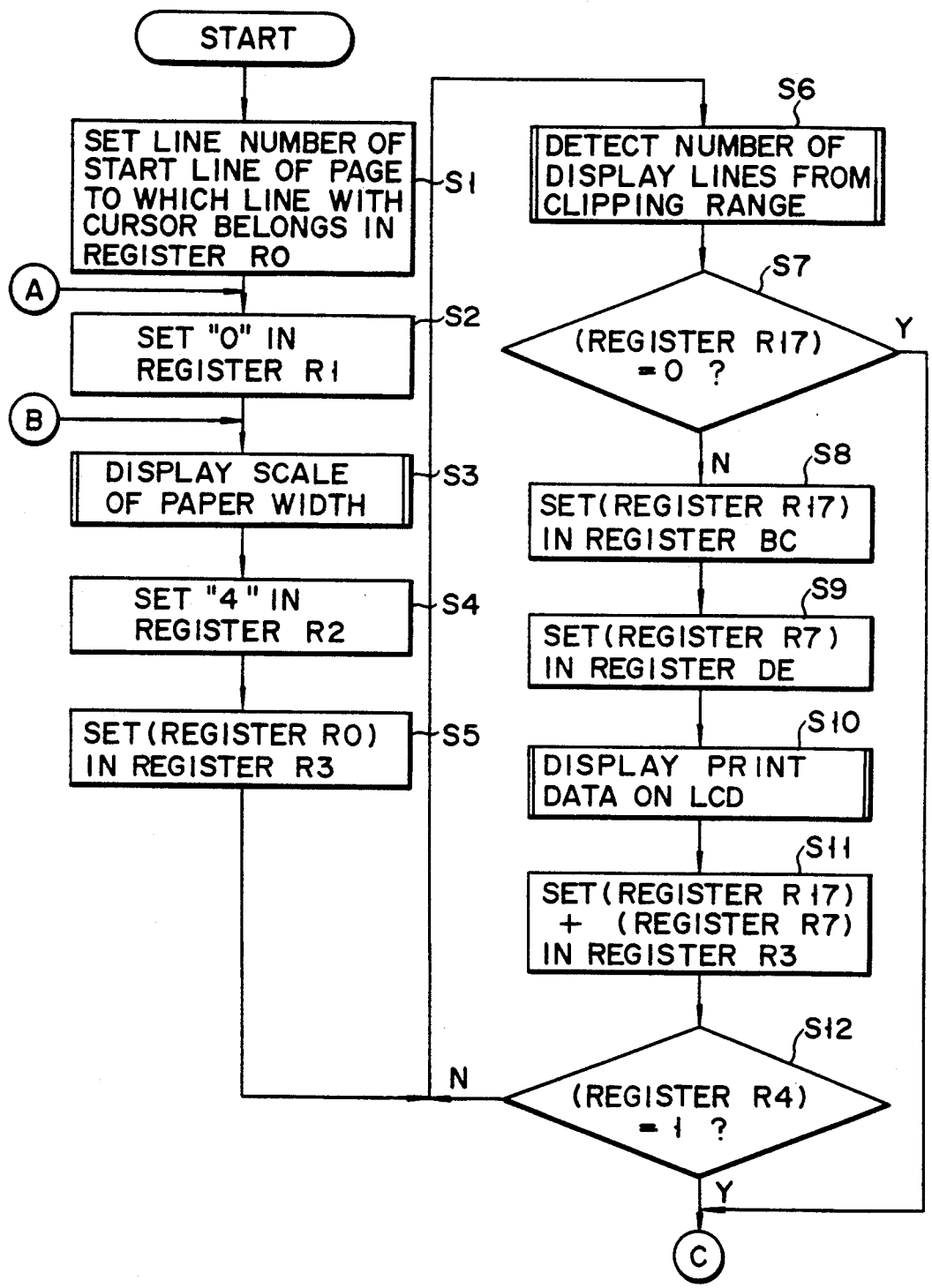
FIGS. 6A to 6D are flow charts for explaining the operation of the reduced-layout display apparatus according to the present invention.
Figure 6B:
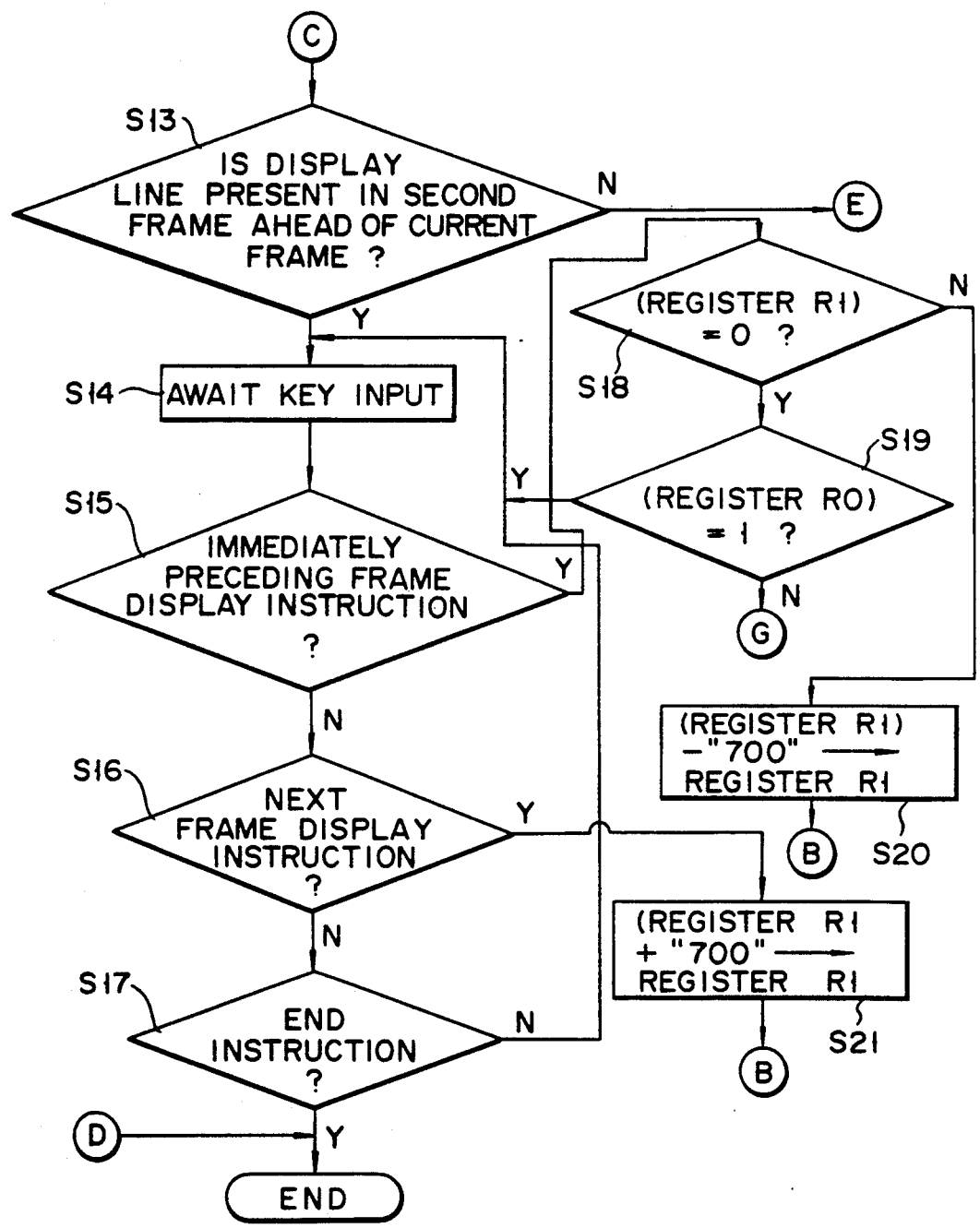
Figure 6C:
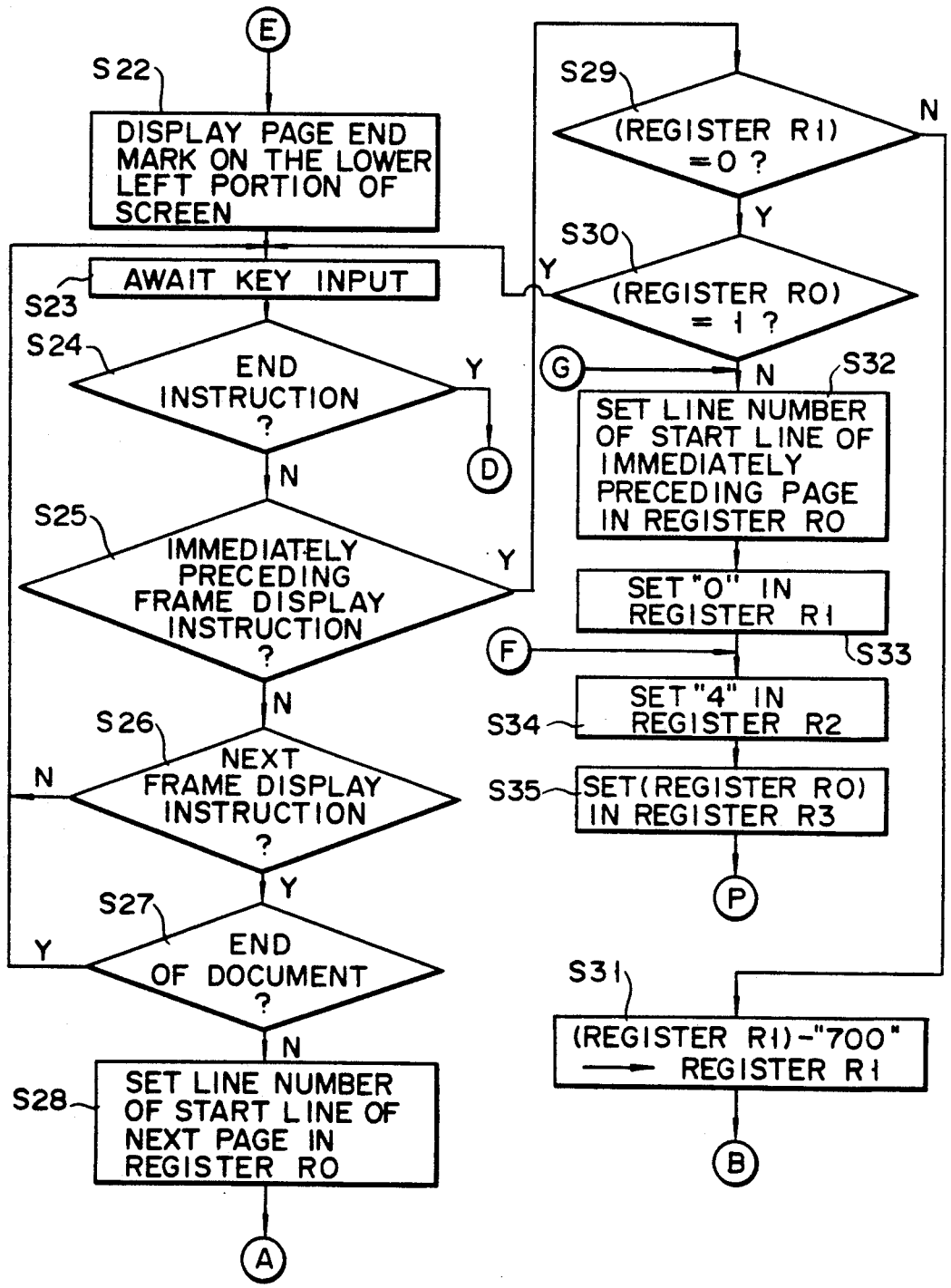
Figure 6D:
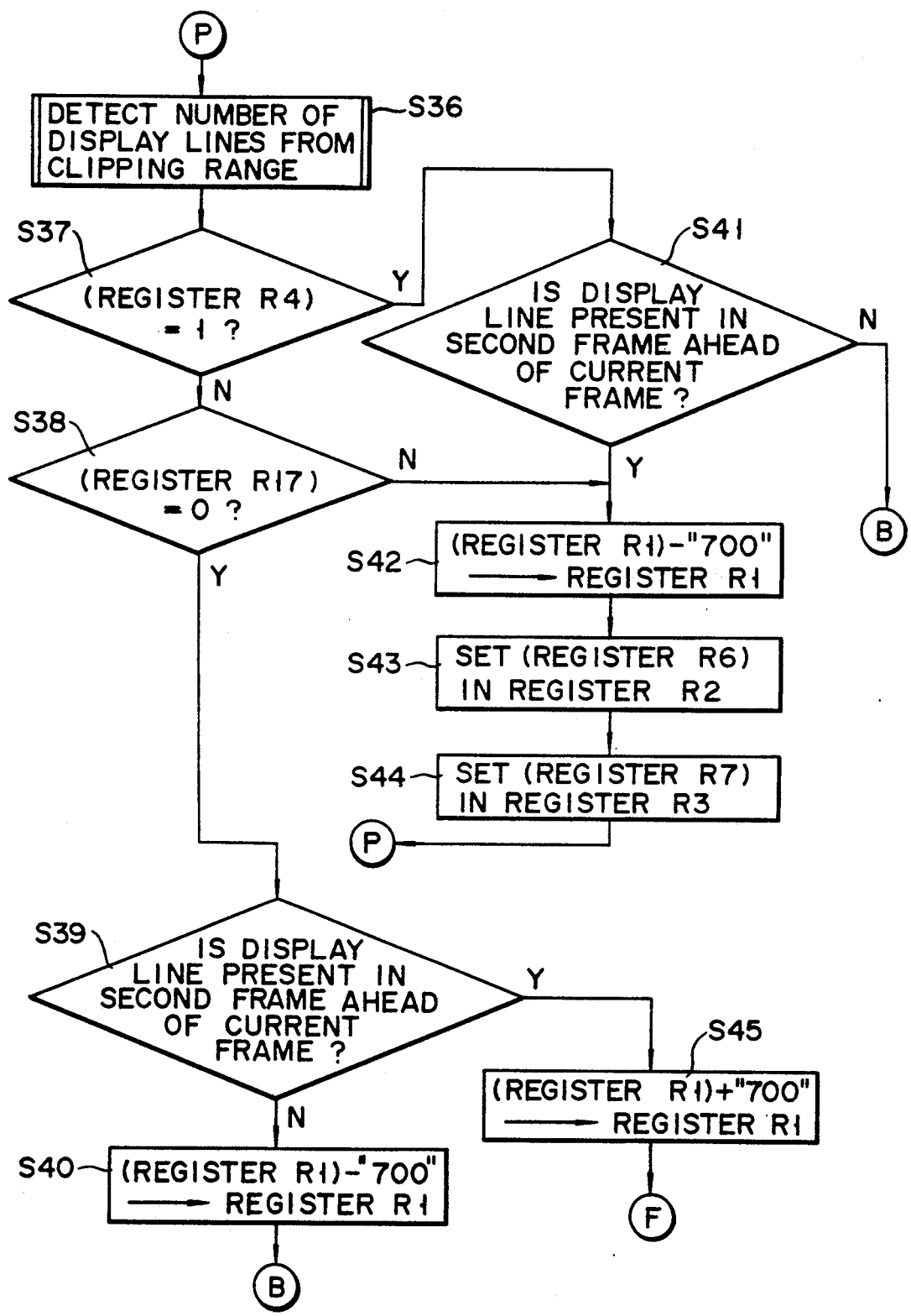

After the write processing to V-RAM 140 is completed, in step S11 shown in FIG. 6A, the content of register R17 is added to that of register R7, and the sum is stored in register R3. Thereafter, it is checked in step S12 if the content of register R4 is "1". If N in step S12, the detection processing of the number of lines from the clipping range in step S6 is executed again. If Y in step S12, step S13 is executed to check if document data to be displayed is present in a second frame ahead of the current frame. If N in step S13, step S22 is executed. If Y in step S13, step S14 is executed.

In step S14, the next instruction input is awaited. An input from keyboard 30 is converted into a code by PPI 12. CPU 11 checks the instruction content of the converted code in steps S15 to S17. If the code is an end instruction, the print image display mode is ended. If the code is an immediately preceding frame display instruction, step S18 is executed to check if the content of register R1 is "0". If N in step S18, step S20 is executed. If Y in step 518, step S19 is executed to check if the content of register R0 is "1", i.e., if a page start frame is displayed. If N in step S19, step S32 is executed. If Y in step S19, the flow returns to step S14. If the input instruction is a next frame display instruction, step S21 is executed.

The immediately preceding frame display processing is executed in step S20 and the subsequent steps. In step S20, "700" is subtracted from the content of register R1. Thereafter, the paper width scale display processing in step S3 is executed again, and the immediately preceding frame is displayed. The next frame display processing is executed in step S21 and the subsequent steps. In step S21, "700" is added to the content of register R1. Thereafter, the paper width scale display processing in step S3 is executed again, and the next frame is displayed. If the second frame of the first page is currently displayed, the start frame or the third frame is displayed, as shown in FIG. 13.

If it is determined in step S13 that no document data is present in a second frame ahead of the current frame, step S22 is executed. As shown in the third frame of FIG. 13, a page end mark (mark •) is displayed on the lower left corner of the screen. In steps S23 to S26, an input instruction is discriminated as in steps S14 to S17. When the end instruction is input, the print image display mode is ended. If the input instruction is the immediately preceding frame display instruction, it is checked in step S29 if the content of register R1 is "0". If N, "700" is subtracted from register R1 in step S31, and the flow returns to step S3. If Y in step S29, it is checked in step S30 if the content of register R0 is "0". If Y in step S30, and step S23 is executed an input is awaited. If N in step S30, the flow advances to step S32 to execute the last frame display processing of the immediately preceding page. In step S32, a line number of the start line of the immediately preceding page is set in register R0. In step S33, "0" is set in register R1. In step S34, "4" is set in register R2. In step S35, the content of register R0 is set in register R3. Thereafter, in step S36, the detection processing of the number of lines from the clipping range is executed as in step S6.

Thereafter, it is checked in step S37 if the content of register R4 is "1". If Y in step S37, step S41 is executed to check if document data to be displayed is present in a second frame ahead of the current frame. If N in step S41, step S3 is executed again. If Y in step S41, data "700" is added to the content of register R1. In step S43, the content of register R6 is set in register R2. In step S44, the content of register R7 is set in register R2. Thereafter, step S36 is executed.

If N is obtained in step S37, it is checked in step S38 if the content of register R17 is "0". If N in step S38, step S42 is executed. If Y in step S38, it is checked in step S39 if document data to be displayed is present in a second frame ahead of the current frame. If N in step S39, step S40 is executed, and "700" is subtracted from the content of register R1. If Y in step S39, "700" is added to the content of register R1, and step S34 is executed again.

With the above processing, a print image of a designated frame is displayed on the screen of LDC 50.

Figure 11B:
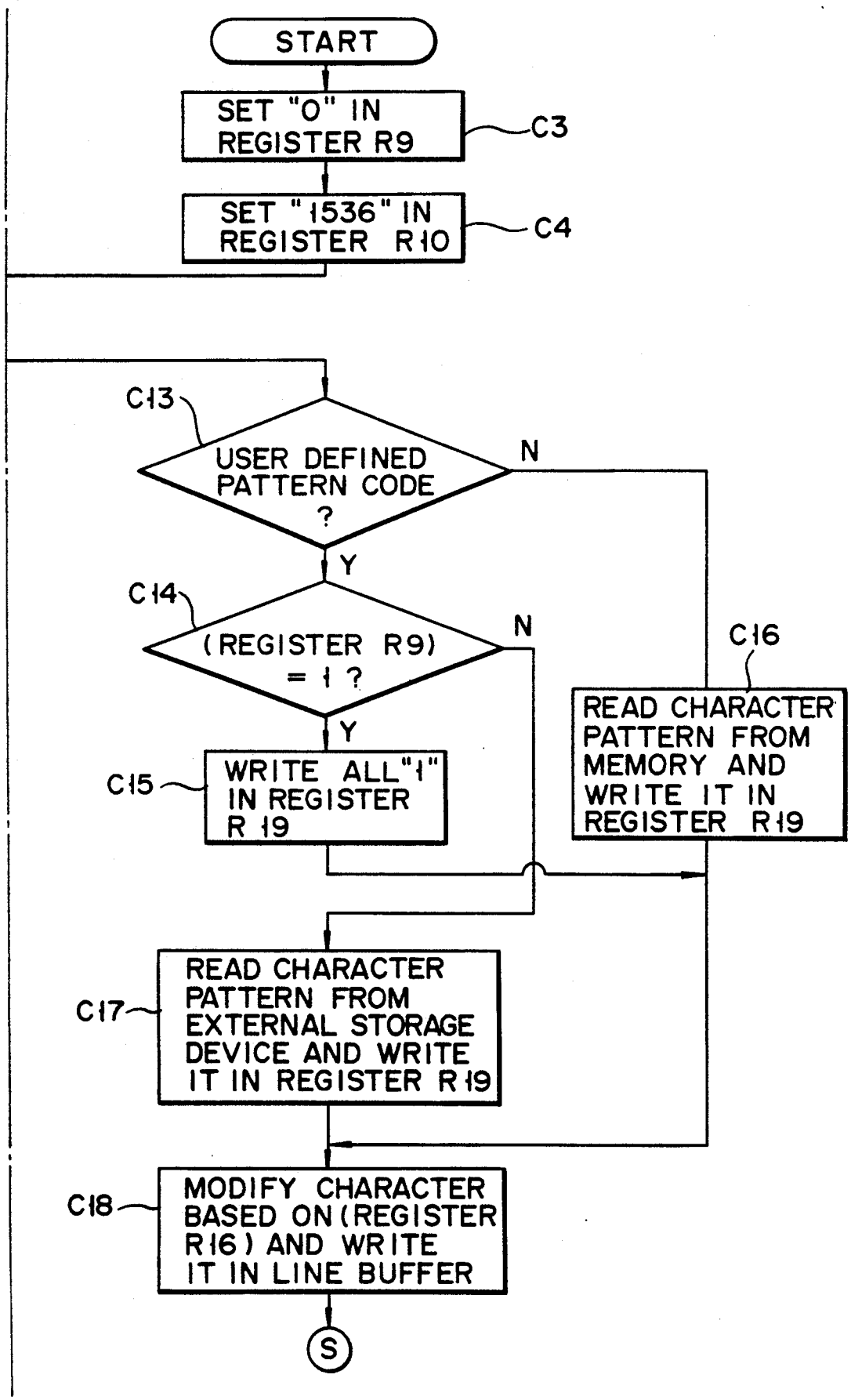
Figure 11C:
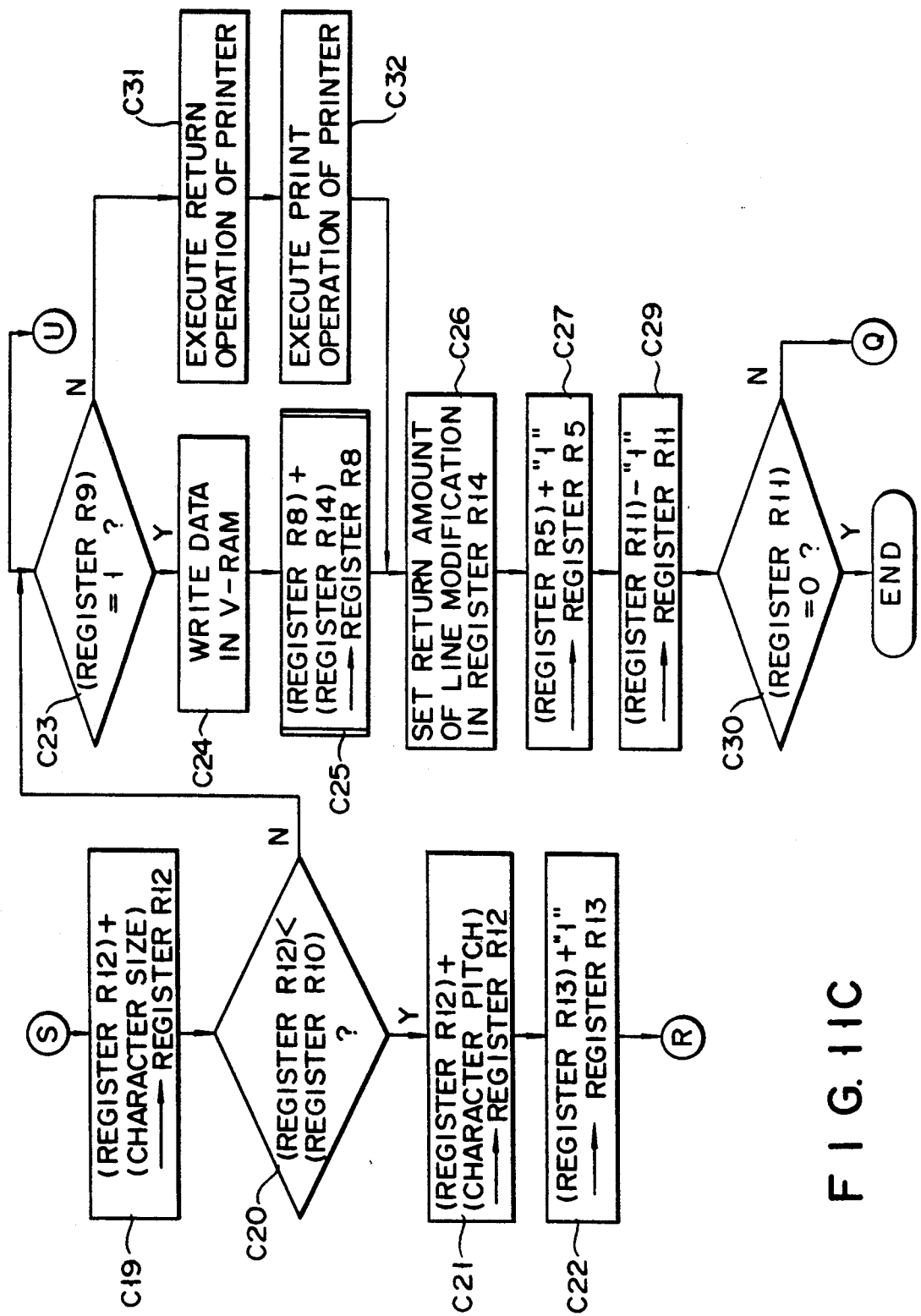

Assume that a print instruction is input after the print image display operation is completed. At this time, the flow charts shown in FIGS. 11A to 11C are executed. In step C3, data "0" is set in register R9. In step C4, "1536" is set in register R10. Thereafter, steps C5 to C23 including step C33 are executed in the same manner as in the print image display mode.

If it is determined in step C23 that the content of register R9 is not "1", step C31 is executed, and the printer return processing is executed. In step S32, the print operation is executed. Thereafter, steps C26 to C30 are executed in the same manner as in the print image display mode. After step C30, step C8 is again executed. In this manner, the document data is printed.

As described above, according to the reduced-layout display apparatus of the present invention, a print image can be displayed in a layout similar to that of an actual print. For this processing, since the line buffer is effectively utilized, a special-purpose external device need not be attached.

What is claimed is:

1. A document producing apparatus, comprising:
   display buffer means for storing image data in units of dots;
   display means for displaying an image represented by the image data in the display buffer means in a layout display mode;
   document storage means for storing document code data representing a produced document;
   printer buffer means for storing document pattern data;
   printer means for printing a document image represented by the document pattern data in the printer buffer means in a print mode; and
   processing means for converting the document code data stored in the document storage means into the document pattern data to store the document pattern data in the printer buffer means, for reducing the document pattern data stored in the printer buffer means to obtain a reduced document image data, and for storing the reduced document image data as the image data into the display buffer means such that the display means displays a reduced document image represented by the reduced document image data, the reduced document image corresponding to the printed document image.

2. An apparatus according to claim 1, wherein said processing means stores the document pattern data into the printer buffer means in accordance with at least one of a character pitch and a predetermined document margin.

3. An apparatus according to claim 1, wherein the processing means generates graphic pattern data and stores the graphic pattern data into the display buffer means, and wherein the display means displays the reduced document image accompanied by a graphic image represented by the graphic pattern data.

4. An apparatus according to claim 3, wherein the graphic pattern data represents a frame of a sheet on which the document pattern data is to be printed.

5. An apparatus according to claim 4, wherein the display means displays a portion of the reduced document image, and the processing means reduces a document pattern data portion representing one block of the document image.

6. An apparatus according to claim 4, wherein the processing means reduces a document pattern data portion representing another block of the document image, a portion of which overlaps a preceding block.

7. An apparatus according to claim 6, further comprising input means for instructing the processing means to reduce a document pattern data portion representing a next block of the document image.

8. An apparatus according to claim 6, further comprising input means for instructing the processing means to reduce the document pattern data portion representing the preceding block of the document image.

9. An apparatus according to claim 1, wherein the processing means comprises:
first processing means for converting the document code data stored in the document storage means into the document pattern data to store the document pattern data in the printer buffer means in the layout display mode and in the print mode; and
second processing means for, in the layout display mode, reducing the document pattern data stored in the printer buffer means to obtain a reduced document image data, and for storing the reduced document image data as the image data into the display buffer means such that the display means displays a reduced document image represented by the reduced document image data, the reduced document image corresponding to the printed document image.

10. An apparatus according to claim 1, wherein the processing means stores the reduced document image data in the display buffer means in accordance with a line pitch predetermined for printing the document image.

11. A method of displaying a layout of a document, the method comprising the steps of:
generating document pattern data from document code data in a print buffer both in a layout display mode and in a print mode, the document pattern data in the print buffer representing an image of the document to be printed;
printing the document pattern data in the print buffer by a printer in the print mode;
reducing the document pattern data stored in the print buffer at a reduction ratio to obtain reduced pattern data as display pattern data in the layout display mode;
storing the reduced pattern data in a display buffer; and
displaying the reduced pattern data stored in the display buffer so that the image of the document is displayed.

12. A method according to claim 11, further comprising the steps of:
generating graphic data;
storing the graphic data in the display buffer to display the graphic data together with the reduced pattern data.

13. A method according to claim 12, wherein the graphic data is printing sheet pattern data representing a frame of a printing sheet on which the document pattern data are to be printed by the printer.
storing the graphic data in the display buffer to display the graphic data together with the reduced pattern data.

14. A method according to claim 11, wherein the step of generating document pattern data generates the document pattern data in accordance with a character pitch and/or a margin.

15. A method according to claim 11, further comprising the steps of:
generating next document pattern data from document code data to store the next document pattern data in the print buffer;
reducing the next document pattern data stored in the print buffer at the reduction ratio to obtain the next reduced pattern data as display pattern data;
storing the next reduced pattern data in the display buffer in accordance with a line pitch; and
displaying the next reduced pattern data.

16. A method according to claim 11, further comprising the step of repeating the steps for displaying reduced pattern data for a next block of a plurality of blocks of a document after the reduced pattern data for one block has been displayed, and wherein portions of the blocks overlap each other.

17. A document producing apparatus comprising:
display buffer means for storing display pattern data in units of dots;
document storage means for storing document code data representing a document, character pitch data, and line pitch data;
processing means for generating reduced pattern data representing a printed image of the document in accordance with the document code data, the character pitch data, and the line pitch data and storing the reduced pattern data in the display buffer means; and
display means for displaying an image corresponding to the reduced pattern data.

18. A document producing apparatus according to claim 17, further comprising printing buffer means for storing pattern data to be printed, and
wherein the processing means generates document pattern data in accordance with the document code and the character pitch data to store the document pattern data in the printing buffer means, reduces the document pattern data stored in the printing buffer means to obtain the reduced document pattern data and stores the reduced pattern data in the display buffer means in accordance with the line pitch data.

19. A document producing apparatus according to claim 18, wherein the document storage means further stores margin data, and the processing means generates the document pattern data in accordance with the document code data, the character pitch data, the line pitch data, and the margin data.

20. A document producing apparatus according to claim 17, wherein the processing means generates printing sheet pattern data representing a frame of a printing sheet and stores the printing sheet pattern data in the display buffer means.

* * * * *